US012392395B2

(12) United States Patent
Komura

(10) Patent No.: US 12,392,395 B2
(45) Date of Patent: Aug. 19, 2025

(54) TELESCOPIC APPARATUS

(71) Applicant: TOYOTA JIDOSHA KABUSHIKI KAISHA, Aichi-ken (JP)

(72) Inventor: Hirotaka Komura, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/624,124

(22) Filed: Apr. 2, 2024

(65) Prior Publication Data

US 2024/0352991 A1 Oct. 24, 2024

(30) Foreign Application Priority Data

Apr. 18, 2023 (JP) ................. 2023-067764

(51) Int. Cl.
*F16H 7/02* (2006.01)
*F16H 25/18* (2006.01)

(52) U.S. Cl.
CPC .............. *F16H 7/02* (2013.01); *F16H 25/18* (2013.01)

(58) Field of Classification Search
CPC .. B25J 18/02; F16H 19/0618; F16H 19/0645; F16H 25/12; B66F 11/00
See application file for complete search history.

(56) References Cited

U.S. PATENT DOCUMENTS

| 7,213,796 | B2* | 5/2007 | Laforest ................. | B66F 11/00 |
| | | | | 254/89 R |
| 11,371,593 | B2* | 6/2022 | Iwamoto ............ | F16H 19/0645 |
| 11,486,476 | B2* | 11/2022 | Komura ............. | F16H 19/0618 |
| 12,038,069 | B2* | 7/2024 | Erickson ................ | B66F 11/00 |
| 2006/0005651 | A1 | 1/2006 | Laforest | |
| 2018/0351247 | A1 | 12/2018 | Hall et al. | |
| 2021/0378394 | A1* | 12/2021 | Donovan ........... | A46B 15/0044 |
| 2024/0384780 | A1* | 11/2024 | Forté ...................... | F16H 25/12 |

FOREIGN PATENT DOCUMENTS

| JP | 2008-504190 A | 2/2008 |
| JP | 4607772 B2 | 1/2011 |
| WO | 2006/002516 A1 | 1/2006 |

* cited by examiner

*Primary Examiner* — Jake Cook
(74) *Attorney, Agent, or Firm* — HAUPTMAN HAM, LLP

(57) ABSTRACT

To provide a telescopic apparatus which is helically wound to reduce stress generated in two belts forming a pipe structure. A telescopic apparatus according to an embodiment of the present disclosure includes: a telescopic pipe structure formed by helically winding a first belt and a second belt about an axis, the second belt being arranged inside the first belt; a first belt case for housing a part of the first belt which does not form the pipe structure in a spiral form; and a second belt case for housing a part of the second belt which does not form the pipe structure in a spiral form. The first belt case and the second belt case are integrally formed as one component, and the thickness of the first belt is thinner than that of the second belt.

2 Claims, 5 Drawing Sheets

TELESCOPIC APPARATUS

CROSS REFERENCE TO RELATED APPLICATIONS

This application is based upon and claims the benefit of priority from Japanese patent application No. 2023-067764, filed on Apr. 18, 2023, the disclosure of which is incorporated herein in its entirety by reference.

BACKGROUND

The present disclosure relates to a telescopic apparatus.
Japanese Patent No. 4607772 discloses a technique for forming a telescopic pipe structure by helically winding a first belt and a second belt arranged inside the first belt.

SUMMARY

Since the first belt is arranged on the outer side of the second belt, the helix radius of the first belt forming the pipe structure is larger than the helix radius of the second belt forming the pipe structure. The lengths of the first belt and the second belt forming the pipe structure of a predetermined length are different from each other, causing a problem that stress is generated in at least one of the first belt and the second belt.

The present disclosure has been made in view of the problem mentioned above, and according to the present disclosure, it is possible to realize a telescopic apparatus which reduces stress generated in two belts forming a pipe structure by helically winding one belt on the other.

According to an aspect of the present disclosure, a telescopic apparatus includes:
- a telescopic pipe structure formed by helically winding a first belt and a second belt about an axis, the second belt being arranged inside the first belt;
- a first belt case for housing a part of the first belt which does not form the pipe structure in a spiral form; and
- a second belt case for housing a part of the second belt which does not form the pipe structure in a spiral form, wherein
the first belt case and the second belt case are formed integrally as one component, and
a thickness of the first belt is thinner than a thickness of the second belt.

According to the present disclosure, it is possible to realize a telescopic apparatus which reduces stress generated in two belts forming a pipe structure by helically winding one belt on the other.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Reference Example

Figure 1:
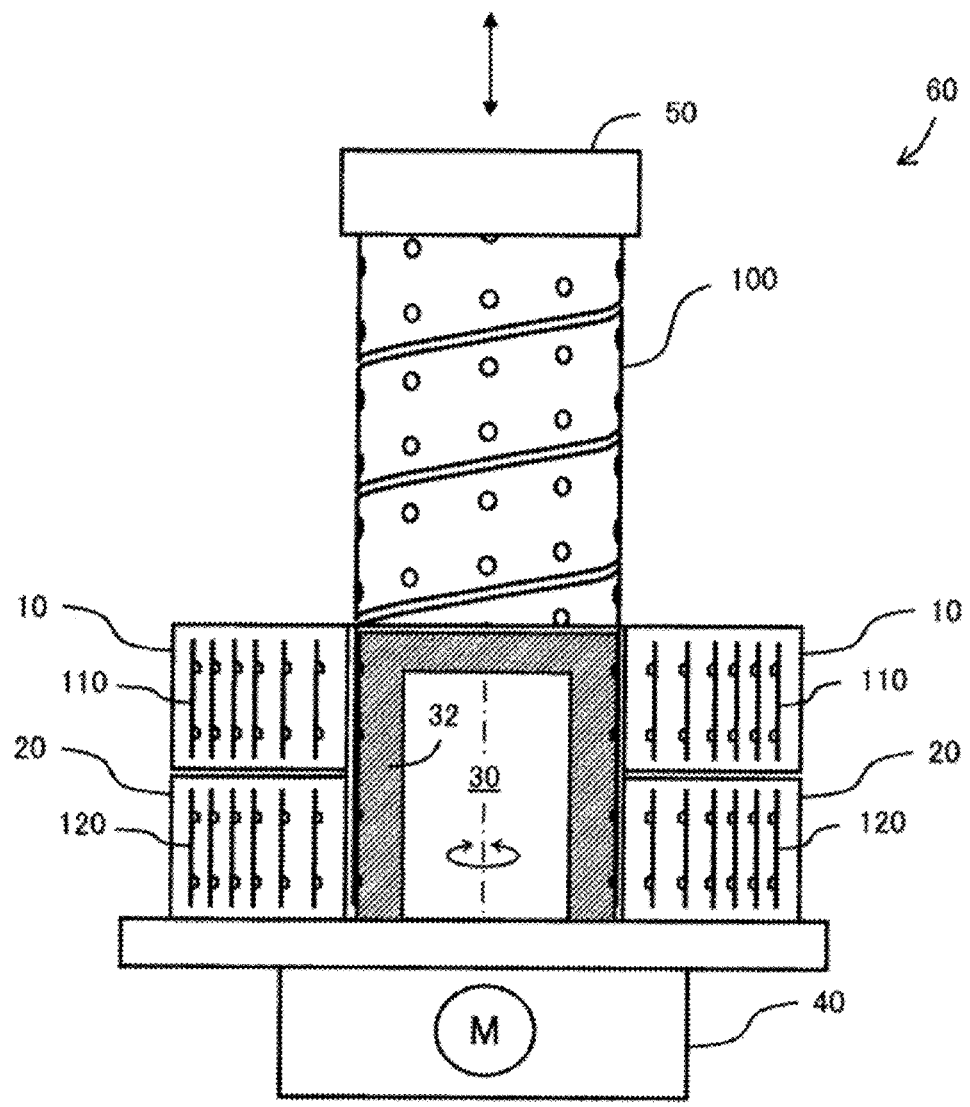
FIG. 1 is an explanatory diagram showing a configuration of a telescopic apparatus according to a reference example.
Figure 2:
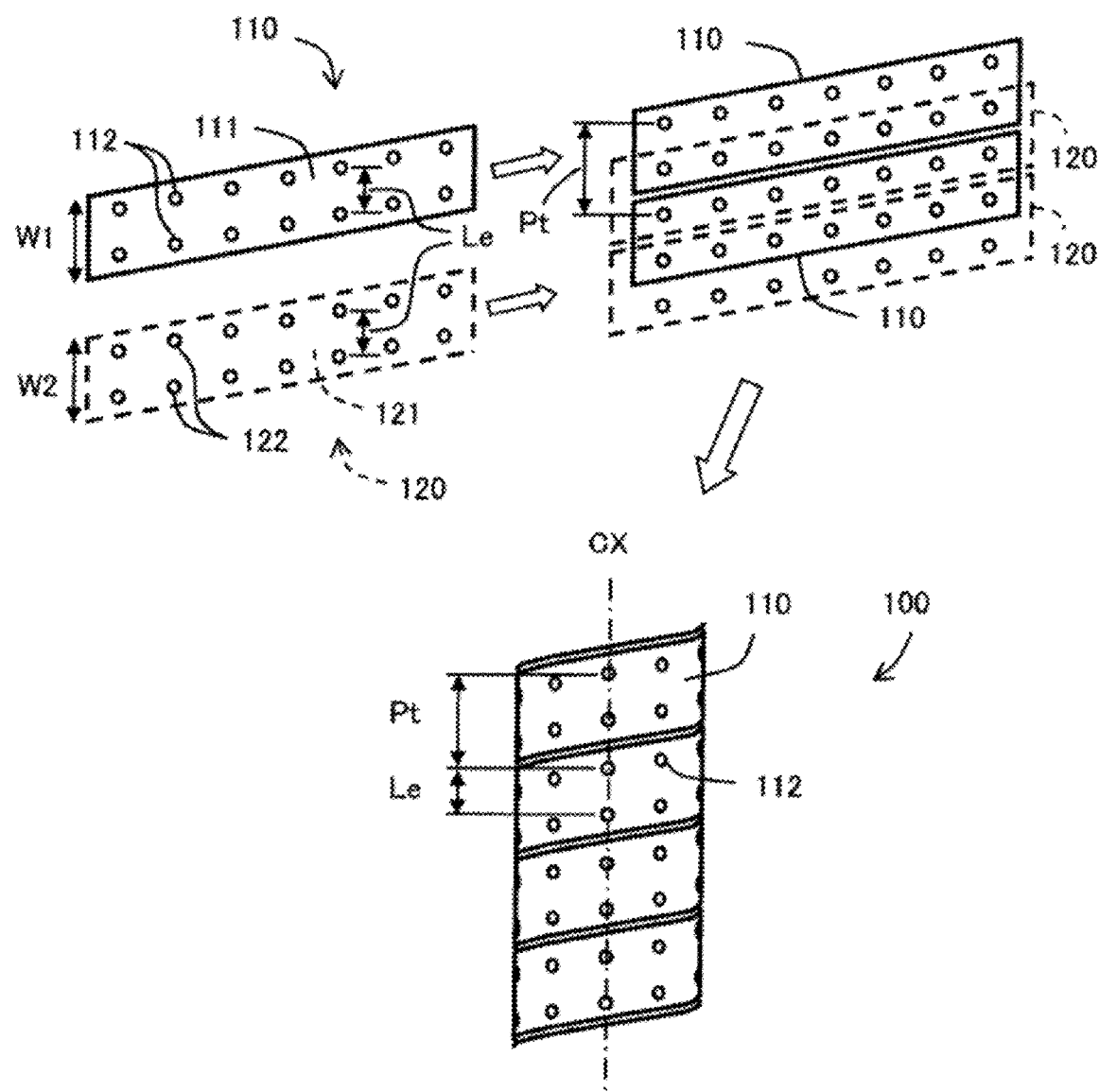
FIG. 2 is an explanatory diagram showing a configuration of a telescopic apparatus according to the reference example.
Figure 3:
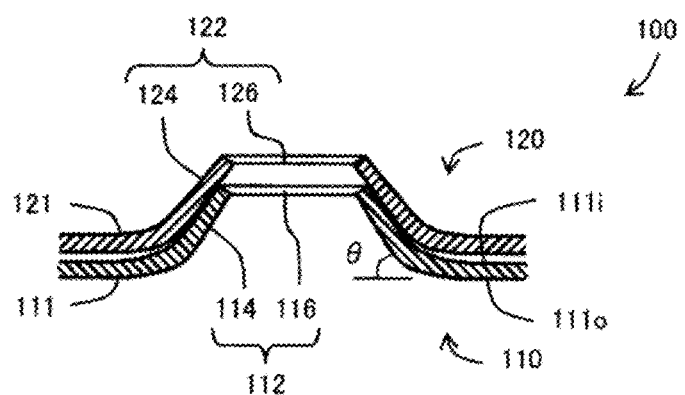
FIG. 3 is an explanatory diagram showing a cross section of a pipe structure according to the reference example.

Referring to FIGS. 1 to 3, a telescopic apparatus 60 according to a reference example will be described. FIG. 1 is an explanatory diagram showing a configuration of the telescopic apparatus 60 including a pipe structure.

The telescopic apparatus 60 according to this reference example includes a pipe structure 100, a first belt case 10, a second belt case 20, a guiding unit 30, a drive unit 40, and a mounting unit 50. The pipe structure 100 is formed by helically winding the first belt 110 around the second belt 120. The first belt case 10 houses a part of the first belt 110 which does not form the pipe structure 100 in a spiral form. The second belt case 20 houses a part of the second belt 120 which does not form the pipe structure 100 in a spiral form. The guiding unit 30 guides the first belt 110 and the second belt 120 so as to helically wind the first belt 110 around the second belt 120. The drive unit 40 rotates the guiding member 32 of the guiding unit 30. The mounting unit 50 is attached to the tip of the pipe structure 100.

When the guiding member 32 rotates in one direction driven by the drive unit 40, the first belt 110 and the second belt 120 are guided by the guiding member 32 and so that the first belt 10 is helically wound around the second belt 120, forming the pipe structure 100 that is elongated upward in FIG. 1. When the guiding member 32 rotates in the reverse direction, the winding of the first belt 110 and the second belt 120 is loosened and the first belt 110 and the second belt 120 are housed in the first belt case 10 and the second belt case 20, respectively, shortening the pipe structure 100. In addition, instead of rotating the guiding member 32, the pipe structure 100 itself may be rotated whereby the pipe structure is expanded and contracted. The first belt 110 and the second belt 120 may be made of metal (e.g., a metal having spring properties such as spring stainless steel). The first belt 110 and the second belt 120 may be made of other materials such as deformable resin.

FIG. 2 is an explanatory view showing how the pipe structure 100 is formed by winding the first belt 110 around the second belt 120. In FIG. 2, the outer shape of the second belt 120 is drawn in dashed lines for the sake of convenience of illustration. The upper left drawing in FIG. 2 shows the state before winding the belts, and the upper right drawing shows the overlapped state of the first belt 110 and the second belt 120 in the wound state in a plane view.

The pipe structure 100 is formed by helically winding the first belt 110 and the second belt 120 arranged inside the first belt 110 about the axis CX. The first belt 110 has a first flat part 111 and a plurality of first engaging parts 112 arranged in a plurality of rows along the longitudinal direction of the first belt 110. The first flat part 111 is a flat strip-like part without any projections or recesses. The first engaging parts 112 are arranged in two rows at regular intervals along the longitudinal direction of the first belt 110. The second belt 120 has a second flat part 121 and a plurality of second engaging parts 122 arranged in a plurality of rows along the longitudinal direction of the second belt 120. The second flat part 121 is a flat strip-like part without any projections or recesses. The second engaging parts 122 are arranged in two rows at regular intervals along the longitudinal direction of the second belt 120.

In the pipe structure 100 shown in the drawings at the bottom of FIG. 2, the first belt 110 is wound at a constant pitch Pt along the axis CX. The distance Le between the two rows of the first engaging parts 112 along the direction of the axis CX is equal to ½ of the winding pitch Pt. These configurations are similar to those of the second belt 120.

The first belt 110 has a width W1 and the second belt 120 has a width W2. These widths W1 and W2 are approximately equal, and are set to a value slightly smaller than the winding pitch Pt.

The first belt 110 and the second belt 120 are superimposed on each other and helically wound in a state in which the first belt 110 is wound around the second belt 120 with a displacement of ½ of the winding pitch Pt. As a result, the first engaging parts 112 of the two rows of the first belt 110 engage with the second engaging parts of the two second belts 120 superimposed on the inside of the first belt 110.

Referring to FIG. 1, the first belt case 10 is rotatably supported about the axis CX. The first belt case 10 rotates according to the length of the first belt 110 pulled out from the first belt case 10. Similarly, the second belt case 20 is rotatably supported about the axis CX. The second belt case 20 rotates according to the length of the second belt 120 pulled out from the second belt case 20.

The telescopic apparatus 60 may transport the load placed on the mounting unit 50.

FIG. 3 is a cross-sectional view of the pipe structure 100 in the reference example. The first engaging part 112 of the first belt 110 is formed as a first hollow projection 114 (hollow truncated cone projection part) projecting toward the axis CX. The first engaging part 112 has an opening 116 in the center. The opening 116 may be omitted. That is, tip end of the first hollow projection 114 may be closed.

The second engaging part 122 of the second belt 120 is configured to be fitted with the first engaging part 112 of the first belt 110. In the reference example, the second engaging part 122, like the first engaging part 112, is also configured as a second hollow projection 124 (hollow truncated cone projection part) projecting toward the axis CX, and has an opening 126 in the center thereof. The opening 126 may be omitted. That is, tip end of the second hollow projection 124 may be blocked. The second engaging part 122 may be configured to have an almost identical shape to the first engaging part 112, and the projection part of the second engaging part 122 is preferably configured to be slightly larger than that of the first engaging part 112.

The inner surface of the first hollow projection 114 and the outer surface of the second hollow projection 124 are configured to come into contact with each other. In this configuration, the contact pressure can be relaxed compared with the case where the two engaging parts come into point contact. As a result, deformation due to contact can be reduced, and noise and vibration can be reduced.

The angle θ formed between the first hollow projection 114 and the first flat part 111 is preferably set in the range of 30 degrees to 85 degrees. The same applies to the second hollow projection 124.

The first engaging part 112 projects inward (on the axis CX-side) from the inner surface 111i of the first flat part 111. On the other hand, there is no part projecting outward from the outer surface 111o of the first flat part 111. These configurations are similar to those of the second belt 120.

The projection height of the first hollow projection 114 and the projection height of the second hollow projection 124 are equal to each other. Therefore, the thickness of the first belt 110 and the thickness of the second belt 120 are equal to each other.

First Embodiment

First, the problems found by the inventors of the present disclosure regarding the telescopic apparatus 60 of the aforementioned reference example will be explained. Since the first belt 110 is arranged on the outer side of the second belt 120 in the pipe structure 100, the helix radius of the first belt 110 forming the pipe structure 100 is larger than the helix radius of the second belt forming the pipe structure 100. Since the first belt 110 forming the pipe structure 100 is longer than the second belt 120, the amount of rotation of the first belt case 10 is larger than the amount of rotation of the second belt case 20. Therefore, when the first belt case 10 and the second belt case 20 are integrated, there is a problem that the tensile stress generated in the first belt 110 is large and the compressive stress generated in the second belt 120 is large. Therefore, the telescopic apparatus according to the first embodiment realizes a configuration in which the stress generated in the first belt 110 and the second belt 120 is reduced.

Hereinafter, the telescopic apparatus according to the first embodiment will be described focusing on the differences with a telescopic apparatus according to a comparative example. The same structural elements/components are denoted by the same reference symbols, and descriptions thereof are omitted where appropriate.

Figure 4:
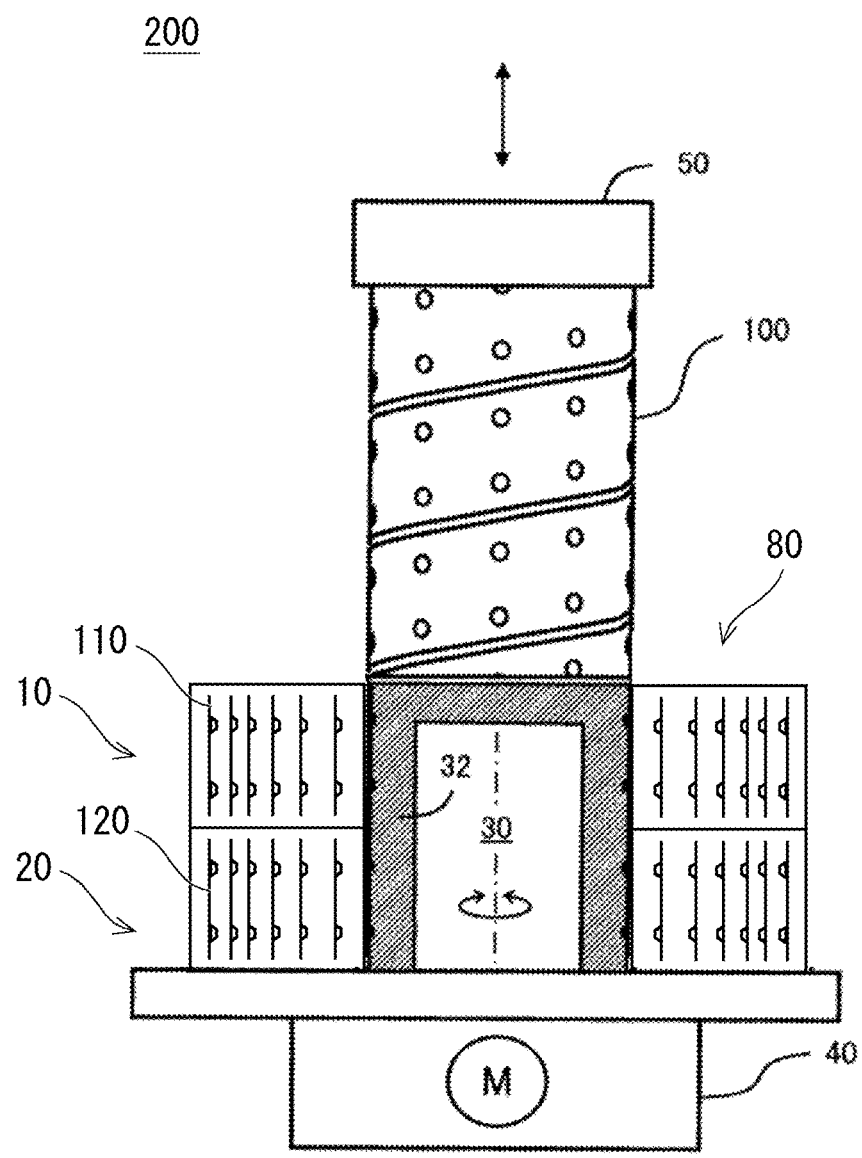
FIG. 4 is an explanatory diagram showing a configuration of a telescopic apparatus according to a first embodiment.

FIG. 4 is an explanatory diagram showing a configuration of a telescopic apparatus 200 according to the first embodiment. The telescopic apparatus 200 includes a belt case 80 in which the first belt case 10 and the second belt case 20 are integrally formed.

Figure 5:
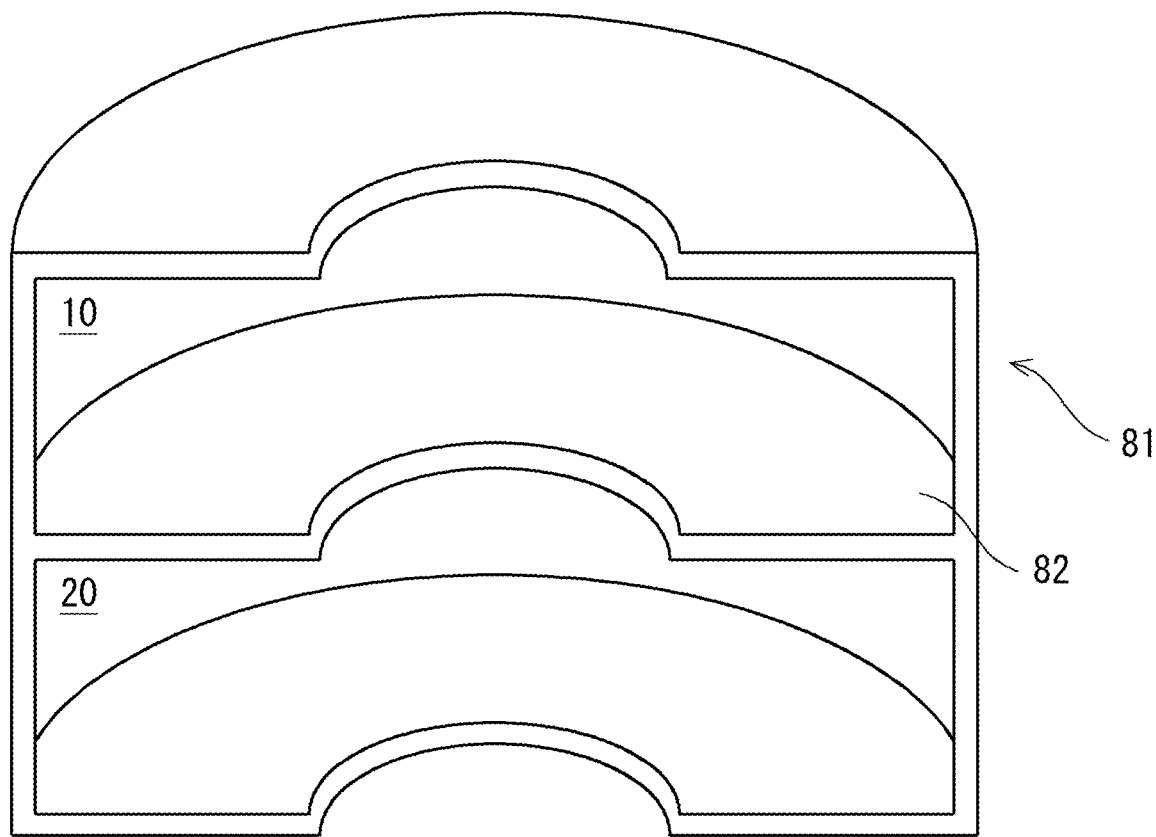
FIG. 5 is an explanatory diagram showing a configuration of a belt case according to the first embodiment.

FIG. 5 is an explanatory view showing a cross section of the belt case 80. The belt case 80 is provided with a housing 81 constituting a tubular body having a top and a bottom, and a partition 82 dividing a space inside the housing 81 into two upper and lower stages. The housing 81 and the partition 82 are provided with a through hole through which the guiding member 32 passes. The belt case 80 is supported in a rotatable state with respect to the guiding member 32. The upper stage of the belt case 80 corresponds to the first belt case 10, and the lower stage corresponds to the second belt case 20. The diameter of the first belt case 10 and the diameter of the second belt case 20 may be equal to each other. One end of the first belt 110 and one end of the second belt 120 may be fixed to the inner surface of the housing 81.

Figure 6:
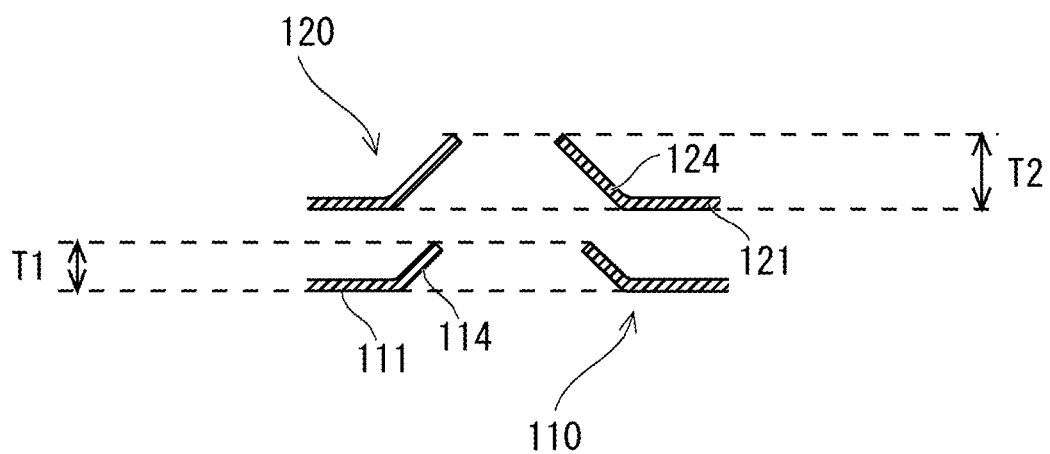
FIG. 6 is an explanatory view showing a configuration of a first belt and a second belt according to the first embodiment.

FIG. 6 is an explanatory view showing the configuration of the first belt 110 and the second belt 120 according to the first embodiment. The thickness T1 of the first belt 110 is smaller than the thickness T2 of the second belt 120. For example, the projection height of the first hollow projection 114 may be lower than the projection height of the second hollow projection 124. Alternatively, the first flat part 111 may be thinner than the second flat part 121.

Since the thickness T1 is smaller than the thickness T2, when the belt case 80 is viewed from the upper surface side thereof, the spiral configuration of the first belt 110 (referred to as a first spiral configuration) is arranged on the outer side of the spiral configuration of the second belt 120 (referred to as a second spiral configuration). In other words, when the first spiral configuration is approximated by a plurality of first concentric circles and the second spiral configuration is approximated by a plurality of second concentric circles, the radius of each first concentric circle is larger than the radius of the corresponding second concentric circle.

In this case, the length of the first belt 110 pulled out when the first belt case 10 is rotated once increases. In other words, assuming that the first belt case 10 and the second belt case 20 are formed as separate components, the amount of rotation of the first belt case 10 decreases. Thus, when the first belt case 10 and the second belt case are formed integrally as one component, the tensile stress generated in the first belt 110 and the compressive stress generated in the second belt 120 decrease.

Since the first belt case 10 and the second belt case 20 are formed integrally, the size of the belt case can be reduced. In addition, the number of parts is reduced, thereby reducing cost.

Next, study by the inventors of the present disclosure will be described using mathematical expressions. When the pipe structure 100 has a predetermined length h, the lengths of the first belt 110 and the second belt 120 forming the pipe structure 100 are expressed by Expressions (1) and (2), respectively. Specifically, the predetermined length h is the length when the pipe structure 100 is at its most elongated position.

[Expression 1]

$$l_1 = h * \sqrt{1 + \left(2\pi \frac{r_1}{p}\right)^2} \quad (1)$$

[Expression 2]

$$l_2 = h * \sqrt{1 + \left(2\pi \frac{r_2}{p}\right)^2} \quad (2)$$

wherein, $l_1$ and $l_2$ represent the lengths of the first belt 110 and the second belt 120 forming the pipe structure 100, respectively, $r_1$ and $r_2$ represent the helix radii of the first belt 110 and the second belt 120, respectively, $r_1$ is larger than $r_2$, and p represents the winding pitch of each belt.

On the other hand, the first belt 110 and the second belt 120 are housed spirally in the belt case 80. The length of each belt housed in the belt case 80 is expressed by Expression (3).

[Expression 3]

$$l = \sum_{j=1}^{n} 2\pi r_j \quad (3)$$

wherein, l denotes the length of each belt, j denotes a subscript representing each winding, n denotes the number of windings, and $r_j$ denotes the radius of the concentric circle corresponding to each winding. The radius of the innermost concentric circle is referred to as $R_i$, and the radius of the outermost concentric circle is referred to as $R_o$. $R_o$ and $R_i$ may correspond to the outer and inner diameters of the belt case 80, respectively. $R_o$ of the first belt 110 is also referred to as $R_{o1}$, and $R_o$ of the second belt 120 is also referred to as $R_{o2}$. Similarly, $R_i$ of the first belt 110 is also referred to as $R_{i1}$, and $R_i$ of the second belt 120 is also referred to as $R_{i2}$.

When the interval between the windings is t, the number of turns n is expressed as $n=(R_o-R_i)/t$, and $r_j=R_i+j*t$. Note that t for the first belt 110 is also referred to as $t_1$, and t for the second belt 120 is also referred to as $t_2$. By transforming Expression (3), Expression (4) can be obtained.

[Expression 4]

$$l = \sum_{j=1}^{n} 2\pi(R_i + j*t) = \frac{\pi}{t}(R_o - R_i)(R_o + R_i - t) \quad (4)$$

Expressions (5) and (6) are obtained from Expressions (1) and (4).

[Expression 5]

$$h * \sqrt{1 + \left(2\pi \frac{r_1}{p}\right)^2} = \frac{\pi}{t_1}(R_{o1} - R_{i1})(R_{o1} + R_{i1} - t_1) \quad (5)$$

[Expression 6]

$$h * \sqrt{1 + \left(2\pi \frac{r_2}{p}\right)^2} = \frac{\pi}{t_2}(R_{o2} - R_{i2})(R_{o2} + R_{i2} - t_2) \quad (6)$$

Further, since the number of windings n of the first belt 110 and the number of windings n of the second belt 120 are equal to each other, Expression (7) can be obtained.

[Expression 7]

$$n = \frac{R_{o1} - R_{i1}}{t_1} = \frac{R_{o2} - R_{i2}}{t_2} \quad (7)$$

When the first belt case 10 and the second belt case 20 are formed as separate components and Expressions (5) to (7) are satisfied, the amount of rotation of the first belt case 10 coincides with amount of rotation of the second belt case 20 during the period when the pipe structure 100 is elongated from the shortest length thereof to the longest length thereof. Therefore, when the first belt case 10 and the second belt case 20 are integrated, the tensile stress generated in the first belt 110 and the compressive stress generated in the second belt 120 decrease.

Ideally, when the first belt case 10 and the second belt case 20 are formed as separate components, the amount of rotation of the first belt case 10 and amount of rotation of the second belt case 20 until the pipe structure 100 is elongated to an arbitrary length should coincide with each other. However, when the thickness of the first belt 110 and that of the second belt 120 are fixed, it is difficult to completely match the rotational speed of the first belt case with that of the second belt case 20. Therefore, the thickness of the first belt 110 may change in the extension direction of the first belt 110, or the thickness of the second belt 120 may change in the extension direction of the second belt 120 so that the amount of rotation of the first belt case 10 and the amount of rotation of the second belt case 20 coincide until the pipe structure 100 is elongated to an arbitrary length.

In the telescopic apparatus according to the first embodiment, by making the first belt 110 thinner than the second belt 120, the stress generated in the first belt 110 and the second belt 120 can be reduced.

It should be noted that the present disclosure is not limited to the above embodiments and can be suitably changed to the extent that it does not deviate from the gist of thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A telescopic apparatus, comprising:
   a telescopic pipe structure formed by helically winding a first belt and a second belt about an axis, the second belt being arranged inside the first belt;
   a first belt case for housing a part of the first belt which does not form the pipe structure in a spiral form; and
   a second belt case for housing a part of the second belt which does not form the pipe structure in a spiral form, wherein
   the first belt case and the second belt case are formed integrally as one component,
   a thickness of the first belt is thinner than a thickness of the second belt,
   the first belt is provided with a first hollow projection and the second belt is provided with a second hollow projection, the first hollow projection and the second hollow projection being fitted with each other, and
   a projection height of the first hollow projection is lower than a projection height of the second hollow projection.

2. The telescopic apparatus according to claim 1, wherein a diameter of the first belt case and a diameter of the second belt case are equal to each other.

* * * * *